(12) United States Patent
Su et al.

(10) Patent No.: US 6,956,180 B1
(45) Date of Patent: Oct. 18, 2005

(54) WATERTIGHT KEY UNIT FOR AN ELECTRONIC DEVICE

(75) Inventors: Fei-Ming Su, Yuan-Lin Chen (TW); Shun-Fu Chen, Hsi-Chou Hsiang (TW)

(73) Assignee: Universal Scientific Industrial Co., Ltd., Nan-Tou Hsien (TW)

( * ) Notice: Subject to any disclaimer, the term of this patent is extended or adjusted under 35 U.S.C. 154(b) by 0 days.

(21) Appl. No.: 10/972,043

(22) Filed: Oct. 22, 2004

(51) Int. Cl.[7] ............................................... H01H 9/00
(52) U.S. Cl. ................................ 200/302.3; 200/302.1
(58) Field of Search ............................ 200/5 R, 6 A, 200/18, 17 R, 302.1–302.3, 4; 341/22; 345/157, 345/161; 273/148 R, 148 B; 463/36–38; 361/680–683; 400/472–491.3

(56) References Cited

U.S. PATENT DOCUMENTS

| | | | |
|---|---|---|---|
| 6,448,957 B1 * | 9/2002 | Chia-Hung | 345/161 |
| 6,626,473 B1 * | 9/2003 | Klein et al. | 292/347 |
| 6,710,273 B1 * | 3/2004 | Skarlupka et al. | 200/302.3 |
| 6,771,992 B1 * | 8/2004 | Tomura et al. | 455/575.1 |
| 6,777,632 B1 * | 8/2004 | Tamaki et al. | 200/302.3 |
| 6,869,240 B2 * | 3/2005 | Ito | 400/490 |

* cited by examiner

*Primary Examiner*—Michael A. Friedhofer
(74) *Attorney, Agent, or Firm*—Merchant & Gould P.C.

(57) ABSTRACT

A watertight key unit includes a key and an elastic sealing part. The key is mounted on a key-mounting wall, extends through a key-inserting hole in the key-mounting wall, and has a peripheral wall. The sealing part extends from a lower end of the peripheral wall of the key, has a peripheral wall that surrounds the peripheral wall of the key, and cooperates with the peripheral wall of the key to define a spacing groove therebetween. The peripheral wall of the sealing part is surrounded by and abuts elastically and sealingly against a hole-defining wall of the key-inserting hole.

8 Claims, 7 Drawing Sheets

WATERTIGHT KEY UNIT FOR AN ELECTRONIC DEVICE

BACKGROUND OF THE INVENTION

1. Field of the Invention

This invention relates to a watertight key unit for an electronic device.

2. Description of the Related Art

FIG. 1 illustrates a conventional personal digital assistant (PDA) 11 that includes a housing with a top cover 111, and a printed circuit board (not shown) mounted in the housing. A plurality of switches (not shown) are electrically connected to the printed circuit board for providing key input functions, such as arrow keys (i.e., left, right, forward and backward keys, enter key, etc.). The top cover 111 is formed with a plurality of holes 1111. A key unit is mounted on the top cover ill, and includes a plurality of keys 12 that respectively extend through the holes 1111, and that are respectively coupled to the switches (not shown) on the printed circuit board for operating the switches. Each of the keys 12 is made from an elastic material, such as rubber, which permits watertight contact between the key 12 and the top cover 111. However, a large spacing is required between two adjacent ones of the keys 12 for facilitating manufacturing of the PDA 11, which is unfavorable in view of current trends toward miniaturization of the PDA 11. In addition, assembly of the keys 12 is time-consuming, which results in an increase in manufacturing costs.

FIGS. 2 and 3 illustrate another conventional PDA 21 that includes a housing, a printed circuit board 212 mounted in the housing, a four-way micro stick switch 213 coupled electrically to the printed circuit board 212 for providing left, right, forward, and backward key input functions, and a multifunctional key 22 mounted on a top cover 211 of the housing and connected to the micro stick switch 213. The top cover 211 is formed with a hole 2111 for extension of the multifunctional key 22 therethrough. A gap 20 is required to be formed between the multifunctional key 22 and a hole-defining wall that defines the hole 2111 so as to permit operation of the multifunctional key 22 and the micro stick switch 213. By integrating the left, right, forward, and backward key input functions into an assembly of the multifunctional key 22 and the micro stick switch 213, the aforesaid drawbacks of the conventional PDA 11 of FIG. 1 can be avoided. However, the multifunctional key 22 of the conventional PDA 21 is non-watertight due to the presence of the gap 20. As a consequence, the printed circuit board 212 of the conventional PDA 21 may be damaged by water when water accidentally enters through the gap 20 and into the housing of the PDA 21.

SUMMARY OF THE INVENTION

Therefore, the object of this invention is to provide a watertight key unit that is capable of overcoming the aforesaid drawbacks of the prior art.

According to the present invention, a watertight key unit is provided for an electronic device. The electronic device defines an inner space therein, and has a key-mounting wall that is formed with a key-inserting hole defined by a hole-defining wall and in spatial communication with the inner space, a printed circuit board disposed in the inner space, and a micro stick switch coupled electrically to the printed circuit board. The watertight key unit includes: a multifunctional key adapted to be mounted on the key-mounting wall and to extend through the key-inserting hole in the key-mounting wall to connect with the micro stick switch, and having a peripheral wall that is adapted to extend through the key-inserting hole and that has a lower end adapted to be received in the inner space in the electronic device; and an elastic sealing part extending from the lower end of the peripheral wall of the multifunctional key, having a peripheral wall that surrounds the peripheral wall of the multifunctional key, and cooperating with the peripheral wall of the multifunctional key to define a spacing groove therebetween. The peripheral wall of the sealing part is adapted to be surrounded by and to abut elastically and sealingly against the hole-defining wall of the key-inserting hole.

BRIEF DESCRIPTION OF THE DRAWINGS

Other features and advantages of the present invention will become apparent in the following detailed description of the preferred embodiment of the invention, with reference to the accompanying drawings. In the drawings.

DETAILED DESCRIPTION OF THE PREFERRED EMBODIMENT

FIGS. 4 to 7 illustrate the preferred embodiment of an electronic device 3, such as a personal digital assistant, according to this invention.

Figure 1:
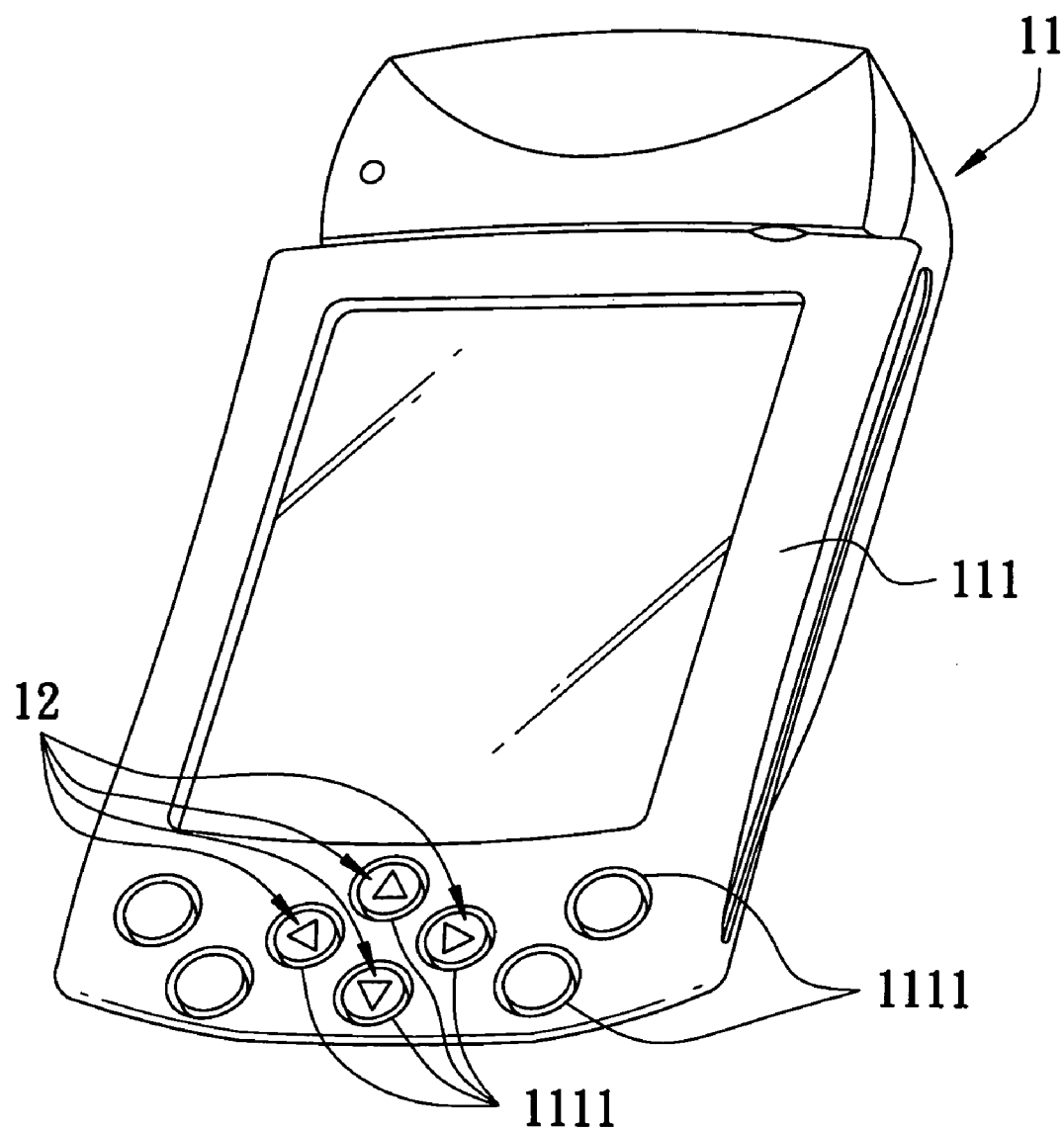
FIG. 1 is a perspective view of a conventional personal digital assistant with a plurality of watertight keys.
Figure 2:
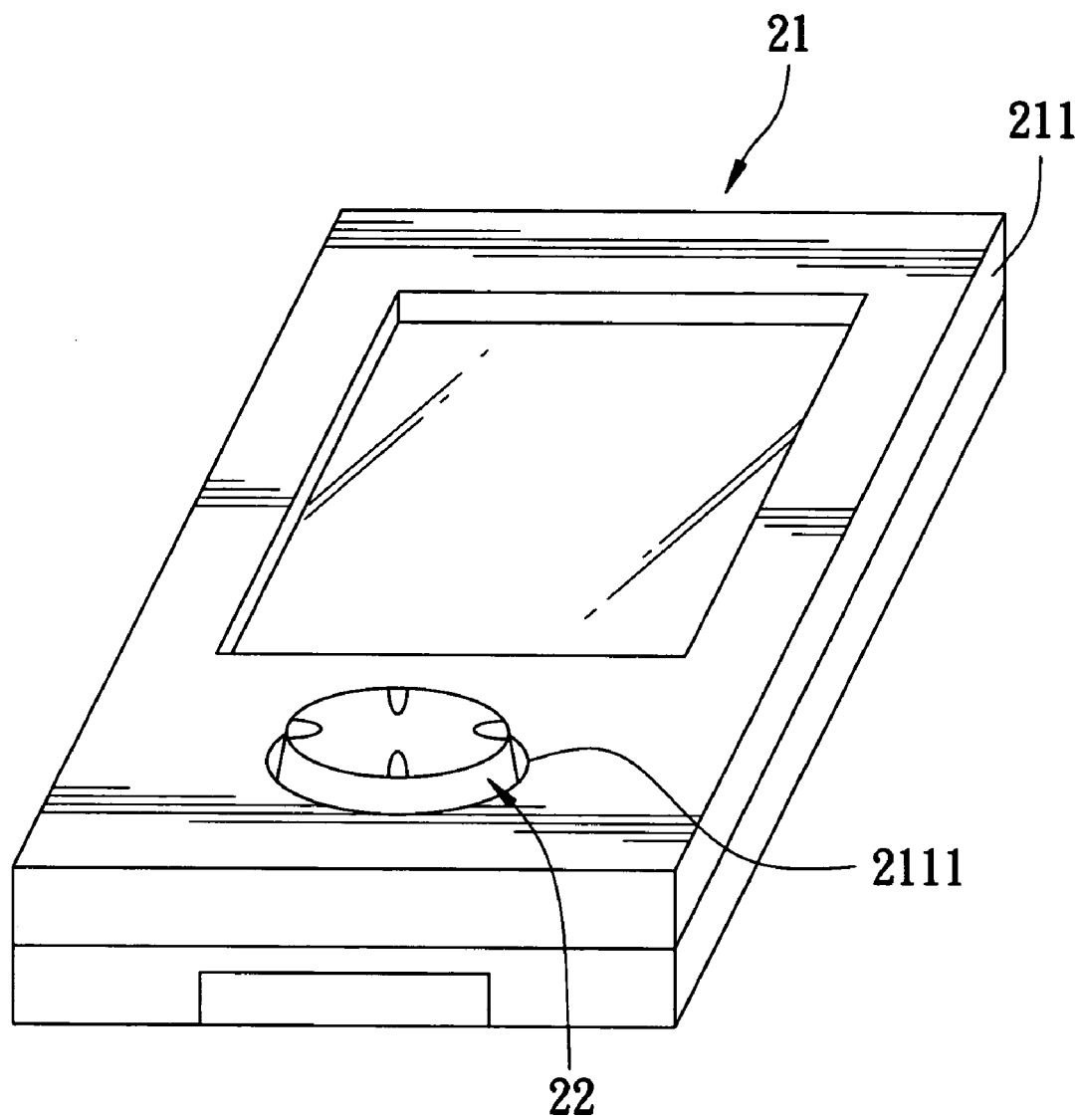
FIG. 2 is a perspective view of another conventional personal digital assistant with a non-watertight multifunctional key.
Figure 3:
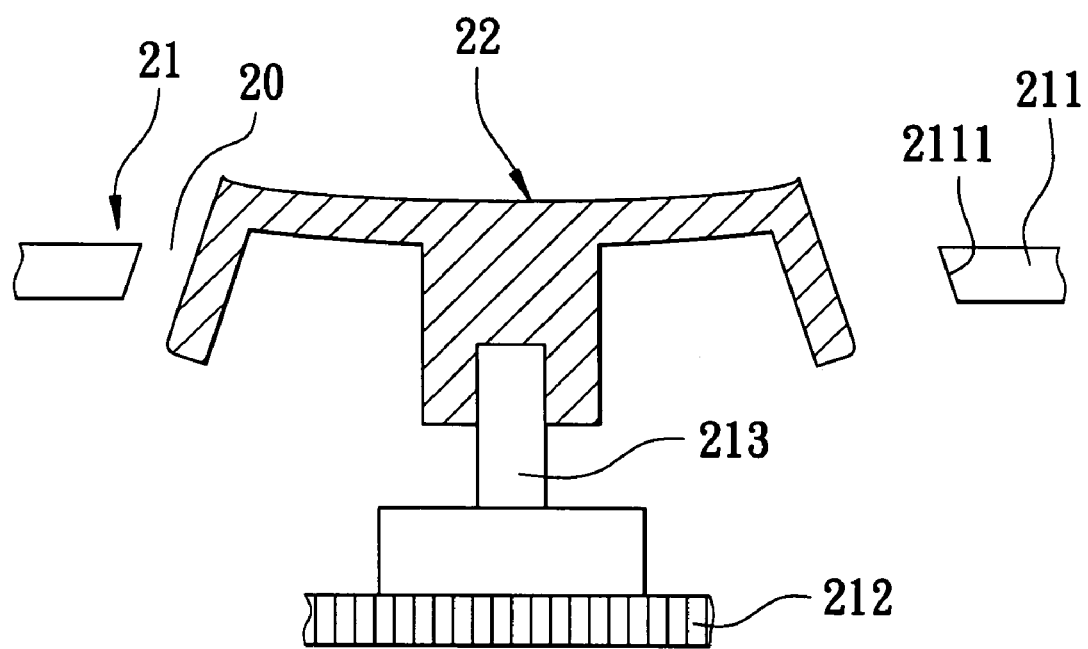
FIG. 3 is a fragmentary sectional view to illustrate how a micro stick switch is operated through the multifunctional key of the personal digital assistant of FIG. 2.
Figure 4:
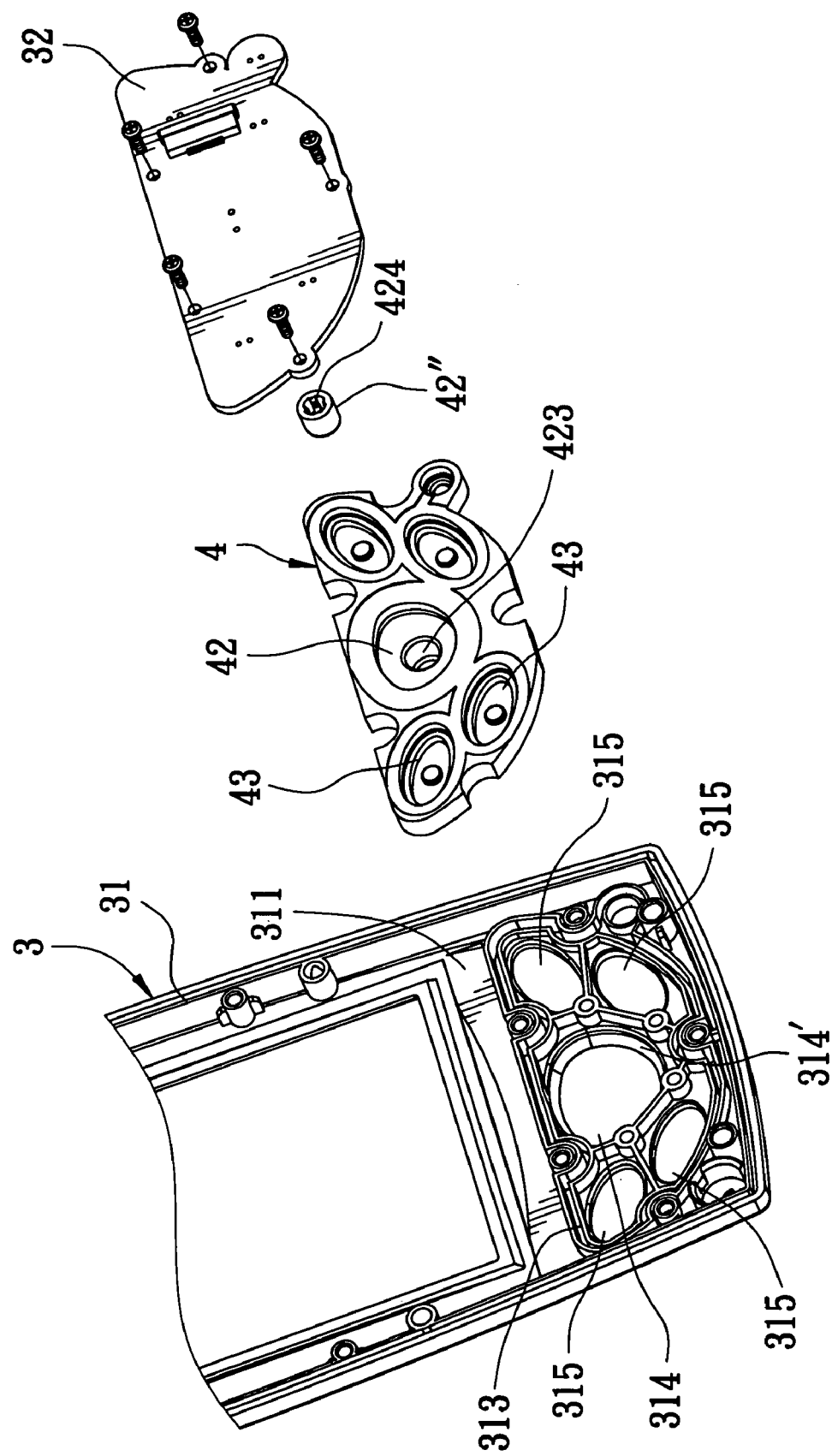
FIG. 4 is a fragmentary, exploded rear perspective view of the preferred embodiment of a personal digital assistant according to this invention.
Figure 5:
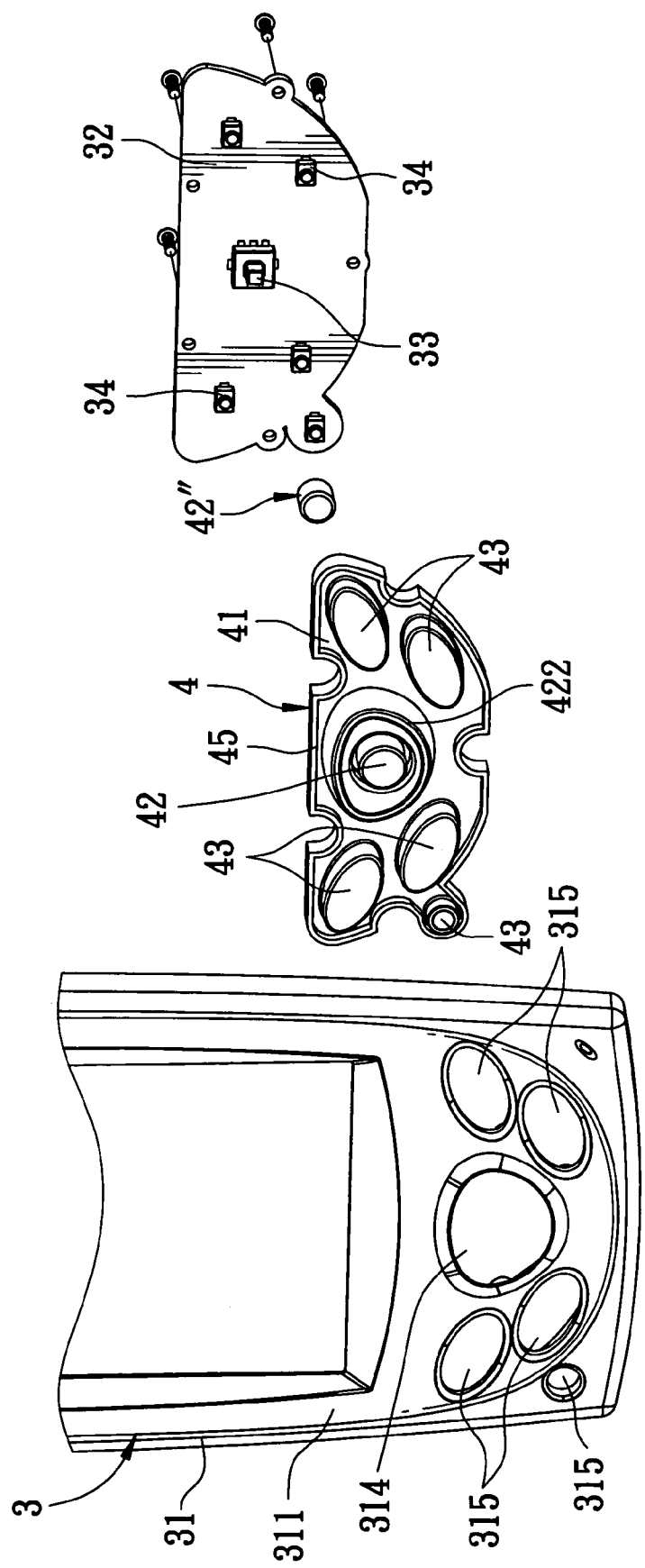
FIG. 5 is a fragmentary, exploded front perspective view of the preferred embodiment.
Figure 6:
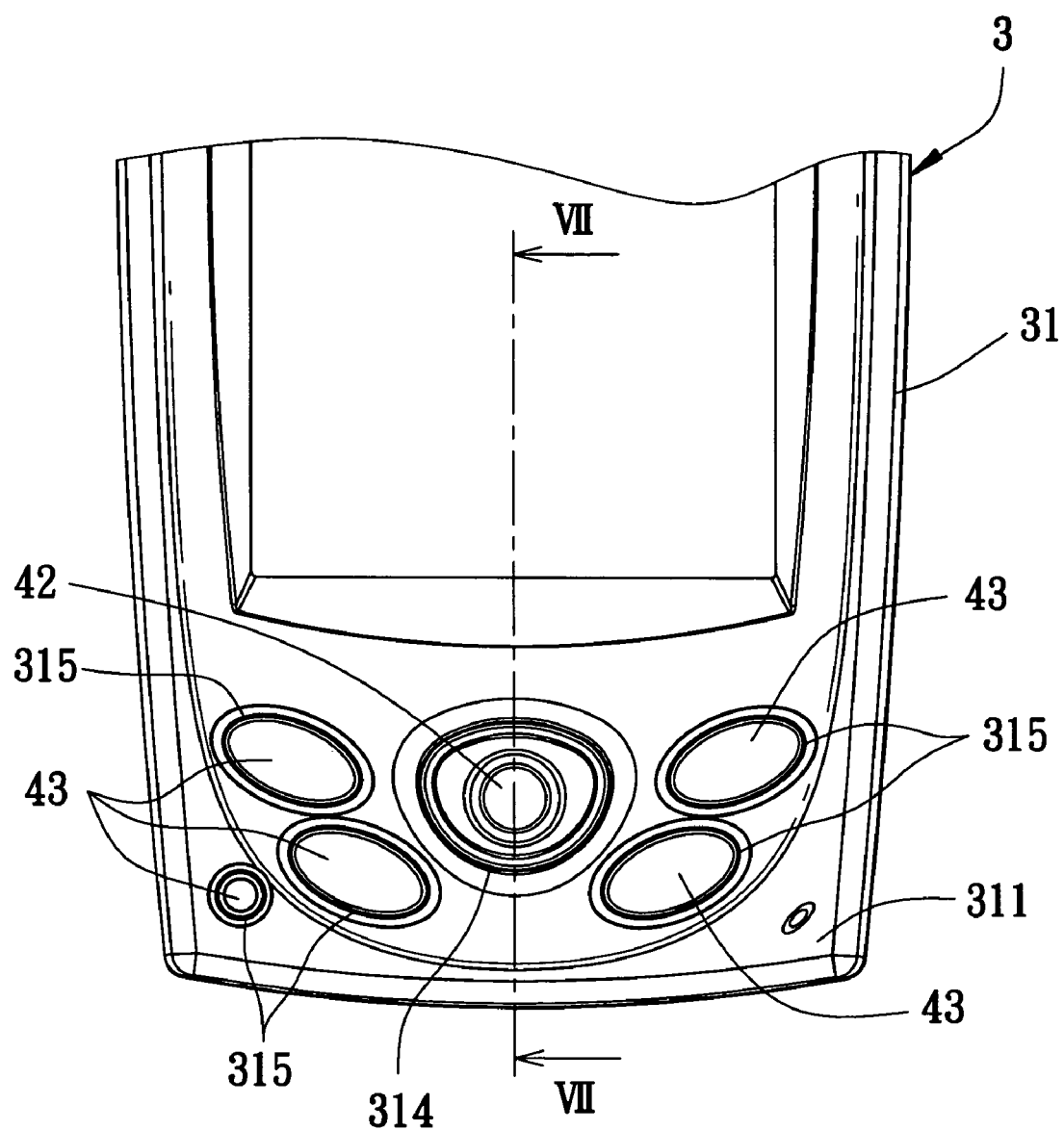
FIG. 6 is a fragmentary schematic front view of the preferred embodiment.
Figure 7:
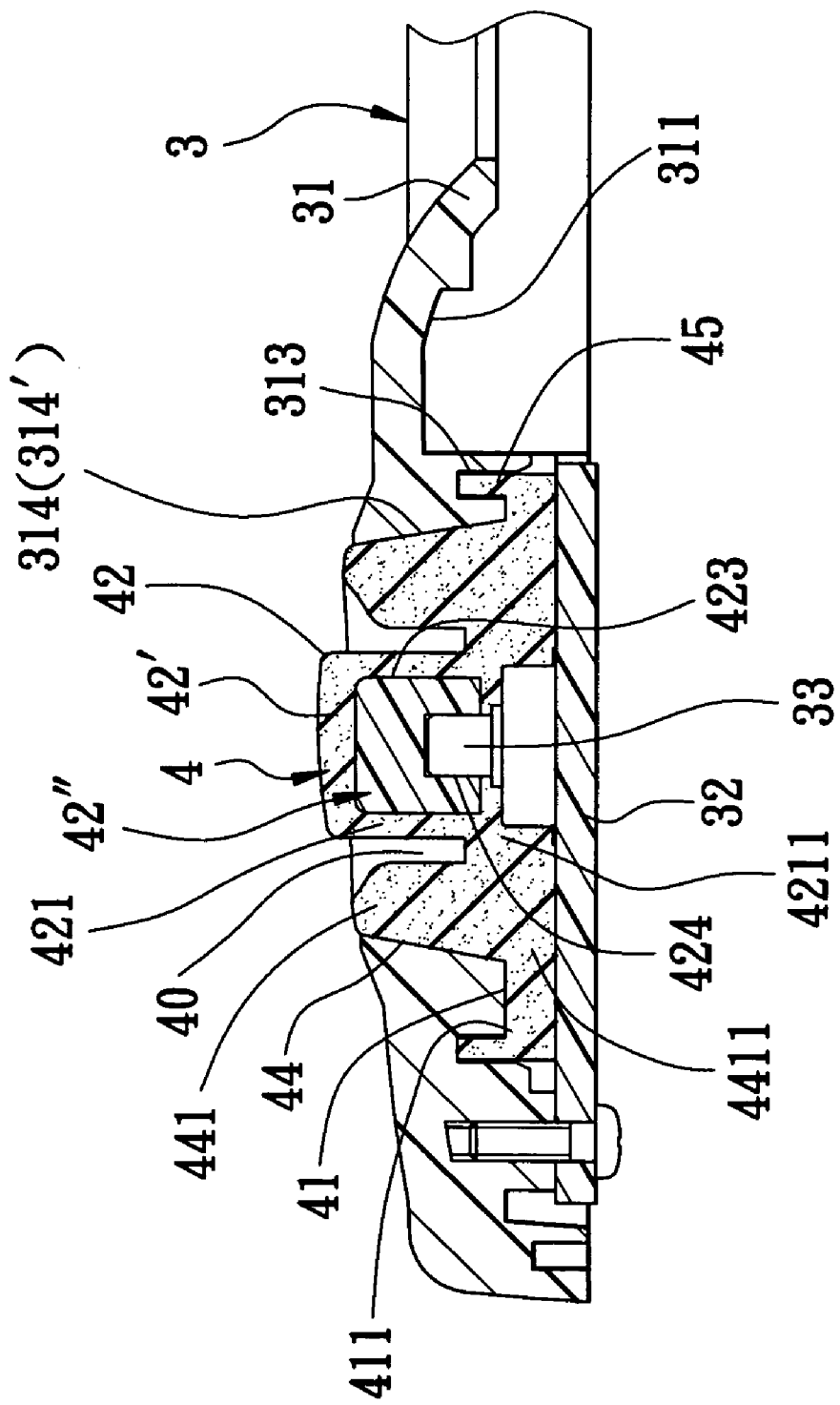
FIG. 7 is a sectional view taken along lines VII— VII in FIG. 6.

The electronic device 3 includes: a housing 31 defining an inner space therein and having a key-mounting wall 311 that is formed with a center key-inserting hole 314 defined by a hole-defining wall 314' and in spatial communication with the inner space; a printed circuit board 32 attached to a rear side of the key-mounting wall 311 and disposed in the inner space in the housing 31; a micro stick switch 33 coupled electrically to the printed circuit board 32 and operable to provide key input functions, such as left, right, forward, and backward keys; four pressable switches 34 coupled electrically to the printed circuit board 32; and a watertight key unit 4 including a multifunctional key 42 and an elastic sealing part 44 (see FIG. 7). The multifunctional key 42 is mounted on the key-mounting wall 311, extends through the center key-inserting hole 314 in the key-mounting wall 311 to connect with the micro stick switch 33, and has a peripheral wall 421 that extends through the key-inserting hole 314 in the key-mounting wall 311, and that has a lower end 4211 received in the inner space in the housing 31. The elastic sealing part 44 extends from the lower end 4211 of the peripheral wall 421 of the multifunctional key 42, has a peripheral wall 441 that surrounds the peripheral wall 421 of the multifunctional key 42, and cooperates with the peripheral wall 421 of the multifunctional key 42 to define a spacing groove 40 therebetween so as to permit inclining of the micro stick switch 33 through operation of the multifunctional key 42 to perform a desired key input. The peripheral wall 441 of the sealing part 44 is surrounded by and abuts elastically and sealingly against the hole-defining wall 314' of the center key-inserting hole 314.

In this embodiment, the multifunctional key 42 includes an elastic cap part 42' (see FIG. 7) and a rigid connecting piece 42". The cap part 42' defines the peripheral wall 421 of the multifunctional key 42, is integrally formed with the sealing part 44, and confines an accommodating space 423 therein. The connecting piece 42" is fitted into the accommodating space 423, and is formed with a stick-inserting hole 424. The micro stick switch 33 is snugly fitted into and engages the stick-inserting hole 424 in the connecting piece 42" so as to be operable through the multifunctional key 42.

The key-mounting wall 311 of the housing 31 is further formed with a plurality of side key-inserting holes 315 around the center key-inserting hole 314. The watertight key unit 4 further includes a plurality of single-function keys 43 that are mounted on the key-mounting wall 311 of the housing 31 and that extend respectively through the side key-inserting holes 315 to connect respectively with the pressable switches 34.

The peripheral wall 441 of the sealing part 44 has a lower end 4411. The key-mounting wall 311 of the housing 31 is further formed with an inserting groove 313 that surrounds the center key-inserting hole 314 and the side key-inserting holes 315. The watertight key unit 4 further includes an elastic base part 41 that surrounds and that is integrally formed with the sealing part 44, that extends laterally from the lower end 4411 of the peripheral wall 441 of the sealing part 44, and that has a peripheral edge 411, and an elastic flange part 45 that is integrally formed with and that extends upwardly from the peripheral edge 411 of the base part 41 and that is snugly fitted into the inserting groove 313 in the key-mounting wall 311 of the housing 31 so as to permit mounting of the watertight key unit 4 on the key-mounting wall 311 of the housing 31.

Preferably, the sealing part 44, the cap part 42', the base part 41, and the flange part 45 are made from a rubber material, and are integrally connected as a single piece.

With the inclusion of the elastic sealing part 44, which is integrally formed with the cap part 42' of the multifunctional key 42, in the watertight key unit 4 of the electronic device 3 of this invention, the aforesaid drawbacks associated with the prior art can be eliminated.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A watertight key unit for an electronic device, the electronic device defining an inner space therein and having a key-mounting wall that is formed with a key-inserting hole defined by a hole-defining wall and in spatial communication with the inner space, a printed circuit board disposed in the inner space, and a micro stick switch coupled electrically to the printed circuit board, said watertight key unit comprising:
   a multifunctional key adapted to be mounted on the key-mounting wall and to extend through the key-inserting hole in the key-mounting wall to connect with the micro stick switch, and having a peripheral wall that is adapted to extend through the key-inserting hole and that has a lower end adapted to be received in the inner space in the electronic device; and
   an elastic sealing part extending from said lower end of said peripheral wall of said multifunctional key, having a peripheral wall that surrounds said peripheral wall of said multifunctional key, and cooperating with said peripheral wall of said multifunctional key to define a spacing groove therebetween, said peripheral wall of said sealing part being adapted to be surrounded by and to abut elastically and sealingly against the hole-defining wall of the key-inserting hole.

2. The watertight key unit of claim 1, wherein said multifunctional key includes an elastic cap part and a rigid connecting piece, said elastic cap part defining said peripheral wall of said multifunctional key, being integrally formed with said sealing part, and confining an accommodating space therein, said connecting piece being fitted into said accommodating space and being formed with a stick-inserting hole that is adapted to engage the micro stick switch.

3. The watertight key unit of claim 2, wherein said peripheral wall of said elastic sealing part has a lower end, said watertight key unit further comprising an elastic base part that surrounds and that is integrally formed with said sealing part, that extends laterally from said lower end of said peripheral wall of said sealing part, and that has a peripheral edge, and an elastic flange part that is integrally formed with and that extends upwardly from said peripheral edge of said base part and that is adapted to extend snugly into a retaining groove formed in the key-mounting wall around the key-inserting hole.

4. The watertight key unit of claim 3, wherein said sealing part, said cap part, said base part, and said flange part are made from a rubber material, and are integrally connected as a single piece.

5. An electronic device comprising:
   a housing defining an inner space therein and having a key-mounting wall that is formed with a key-inserting hole defined by a hole-defining wall and in spatial communication with said inner space;
   a printed circuit board disposed in said inner space in said housing;
   a micro stick switch coupled electrically to said printed circuit board; and
   a watertight key unit including
      a multifunctional key mounted on said key-mounting wall, extending through said key-inserting hole in said key-mounting wall to connect with said micro stick switch, and having a peripheral wall that extends through said key-inserting hole in said key-mounting wall, and that has a lower end received in said inner space in said housing, and
      an elastic sealing part extending from said lower end of said peripheral wall of said multifunctional key, having a peripheral wall that surrounds said peripheral wall of said multifunctional key, and cooperating with said peripheral wall of said multifunctional key to define a spacing groove therebetween, said peripheral wall of said sealing part being surrounded by and abutting elastically and sealingly against said hole-defining wall of said key-inserting hole.

6. The electronic device of claim 5, wherein said multifunctional key includes an elastic cap part and a rigid connecting piece, said cap part defining said peripheral wall of said multifunctional key, being integrally formed with said sealing part, and confining an accommodating space therein, said connecting piece being fitted into said accommodating space and being formed with a stick-inserting hole, said micro stick switch being snugly fitted into said stick-inserting hole in said connecting piece.

7. The electronic device of claim 6, wherein said peripheral wall of said sealing part has a lower end, said key-mounting wall of said housing being further formed with an inserting groove that surrounds said key-inserting hole, said watertight key unit further including an elastic base part that surrounds and that is integrally formed with said sealing part, that extends laterally from said lower end of said peripheral wall of said sealing part, and that has a peripheral edge, and an elastic flange part that is integrally formed with and that extends upwardly from said peripheral edge of said base part and that is snugly fitted into said inserting groove in said key-mounting wall.

8. The electronic device of claim 7, wherein said sealing part, said cap part, said base part, and said flange part are made from a rubber material, and are integrally connected as a single piece.

* * * * *